US010812459B2

(12) United States Patent
Dumanois et al.

(10) Patent No.: US 10,812,459 B2
(45) Date of Patent: Oct. 20, 2020

(54) METHOD FOR VERIFYING IDENTITY DURING VIRTUALIZATION

(71) Applicant: Orange, Paris (FR)

(72) Inventors: Antoine Dumanois, Boulogne Billancourt (FR); Arnaud Bellee, Baron-sur-Odon (FR)

(73) Assignee: ORANGE, Paris (FR)

( * ) Notice: Subject to any disclaimer, the term of this patent is extended or adjusted under 35 U.S.C. 154(b) by 186 days.

(21) Appl. No.: 15/773,396

(22) PCT Filed: Oct. 20, 2016

(86) PCT No.: PCT/FR2016/052712
§ 371 (c)(1),
(2) Date: May 3, 2018

(87) PCT Pub. No.: WO2017/077210
PCT Pub. Date: May 11, 2017

(65) Prior Publication Data
US 2018/0324163 A1    Nov. 8, 2018

(30) Foreign Application Priority Data
Nov. 3, 2015    (FR) ...................................... 15 60536

(51) Int. Cl.
*H04L 29/06* (2006.01)
*G06Q 20/38* (2012.01)
(Continued)

(52) U.S. Cl.
CPC ............. *H04L 63/08* (2013.01); *G06Q 20/16* (2013.01); *G06Q 20/36* (2013.01); *G06Q 20/385* (2013.01);
(Continued)

(58) Field of Classification Search
CPC ....................................................... H04L 63/08
See application file for complete search history.

(56) References Cited

U.S. PATENT DOCUMENTS

2002/0198848 A1    12/2002   Michener
2006/0271708 A1 *  11/2006   Bolles .................. G06F 21/552
                                                 709/246
(Continued)

FOREIGN PATENT DOCUMENTS

FR             2867585 A1 *   9/2005   ............. G06Q 20/02

OTHER PUBLICATIONS

Tang et al., CN 104702417, Jun. 2015 (Year: 2015).*
(Continued)

*Primary Examiner* — Shawnchoy Rahman
(74) *Attorney, Agent, or Firm* — David D. Brush; Westman, Champlin & Koehler, P.A.

(57) ABSTRACT

A method of verifying identity of a user of an object virtualized in a memory connected to a terminal of the user. The object includes an identification data item, relating to identity of the bearer thereof. The terminal communicates with a virtualization server. The virtualization server obtains the identification data item, transmits it to a validation server having control of the object, obtains a first data item about the user, generates a first verification data item as a function of the first data item, and transmits it to the validation server. The validation server obtains a second data item about the bearer, generates a second verification data item as a function of the second data item, the function being identical to that used to generate the first verification data item, compares the first and second verification data items, and validates the identity of the user based on the comparison.

12 Claims, 1 Drawing Sheet

(51) Int. Cl.
   *G06Q 20/40* (2012.01)
   *G06Q 20/36* (2012.01)
   *G06Q 20/16* (2012.01)
(52) U.S. Cl.
   CPC ....... *G06Q 20/3827* (2013.01); *G06Q 20/401* (2013.01); *G06Q 20/4014* (2013.01)

(56) References Cited

U.S. PATENT DOCUMENTS

| | | | | |
|---|---|---|---|---|
| 2008/0155019 | A1* | 6/2008 | Wallace | ............... A63F 13/12 709/204 |
| 2009/0131031 | A1* | 5/2009 | Isobe | ............ H04L 29/08846 455/418 |
| 2013/0117822 | A1 | 5/2013 | Soulez | |
| 2015/0032625 | A1* | 1/2015 | Dill | .................. G06Q 20/385 705/44 |
| 2015/0310680 | A1* | 10/2015 | Lablans | ............. G07C 9/00309 340/5.61 |
| 2015/0381729 | A1* | 12/2015 | Manohar | ........... H04W 12/0013 709/203 |

OTHER PUBLICATIONS

Li et al., CN 104954353. Sep. 2015 (Year: 2015).*
International Search Reported dated Feb. 1, 2017 for corresponding International Application No. PCT/FR2016/052712, filed Oct. 20, 2016.
English translation of the International Written Opinion dated Feb. 1, 2017 for corresponding International Application No. PCT/FR2016/052712, filed Oct. 20, 2016.

* cited by examiner

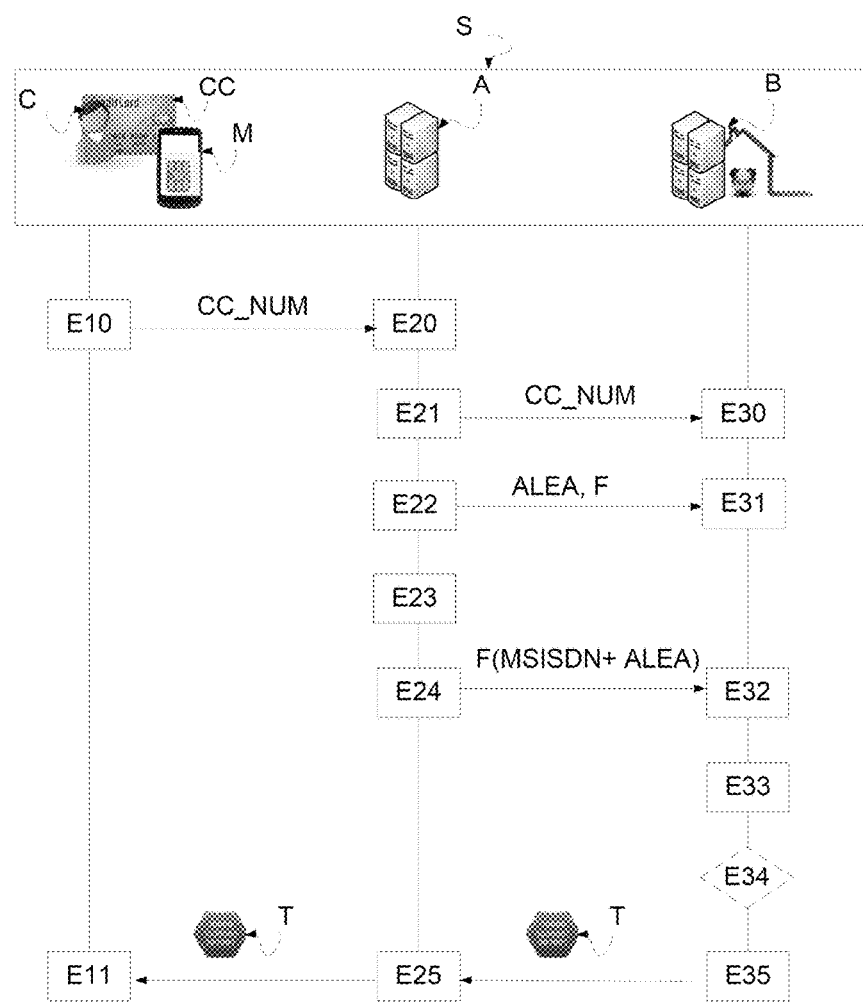

METHOD FOR VERIFYING IDENTITY DURING VIRTUALIZATION

CROSS-REFERENCE TO RELATED APPLICATIONS

This Application is a Section 371 National Stage Application of International Application No. PCT/FR2016/052712, filed Oct. 20, 2016, which is incorporated by reference in its entirety and published as WO 2017/077210 on May 11, 2017, not in English.

TECHNICAL FIELD

The invention relates to the field of virtualization, or tokenization, of objects linked to the identity of a user.

In particular, the invention relates to the verification of identities performed in the virtualization of such objects.

More particularly, the invention relates to the security and the protection of the personal data of the clients of the bank card virtualization methods.

STATE OF THE ART

So-called "tokenized" payment systems have recently emerged, for making payments using a bank card tokenized on an electronic support, for example a mobile terminal, capable of making remote payments or proximity payments with a payment terminal, for example of contactless type (NFC).

Hereinafter, the terms "tokenization" or "virtualization" of an object will be used without discrimination.

These methods have emerged initially in countries which are unconcerned with personal data protection.

The virtualization method used by these payment systems is as follows: the client, or bearer of the card, enters the bank information inscribed on his or her card into an application of the terminal controlled by an aggregator, or supplier, of the payment service. For example, according to one known method, the bearer photographs his or her bank card and enters the security code which is situated on the back. Alternatively, he or she manually enters this information, essential to the identification of the bearer of the card in a transaction. The bank which is responsible for the bank account associated with the card has to validate the virtualization if it estimates that the person who has entered the information is truly the client who is the holder of the card, or bearer. To this end, the virtualization data corresponding to the card, or token, are encrypted on the terminal using encryption keys known only by the banking organization responsible for the card (or by the organization managing the banking scheme under delegation from the banking organization responsible for the card) before being sent to a server of the service aggregator, which returns the data to the bank. The bank receives the data, possibly encrypted, and possibly accompanied by secondary data such as the name of the terminal, its position, etc. When the bank has received the encrypted data, it has two well known methods available for verifying the identity of the bearer of the card (verification of the identity of the bearer should be understood to mean a mechanism that aims to ensure that the bank card is indeed that of the person who loads it into the terminal):

a method of automatic validation of the bearer of the card, after consultation of the content of the data received. This method is also called the "green path" by the person skilled in the art. It does not include any active security mechanism beyond the simple analysis by the bank of all the data received in the virtualization request;

a validation method with secondary verification, during which the bearer supplies another proof of his or her identity to ensure that the registration of the card is indeed done by the bearer and not by another person who had stolen it. That can be done by means of an additional interaction between the bank and the user to obtain an additional proof: sending of a code by SMS, electronic mail, telephone call, etc. This method is called the "yellow path" by the person skilled in the art. This method increases the trust linked to the identification and the verification of the bearer of the card but does, however, suffer from a drawback: the additional level of security provided is highly variable and is often dependent on human factors. Some banks in fact demand as proof only a few digits of a personal number such as the social security number, information that is relatively easy to obtain by criminals in order to register cards of which they are not bearers in order to perform fraudulent purchases.

It has therefore been suggested to further complicate the mechanism for creation of a tokenized card, to ensure that the bank card is indeed that of the person who loads it into the telephone: additional authorization code from the bank sent by mail or telephone to the user, order from the bank to the bearer to call a client service number to verify his or her identity via a series of questions on his or her recent purchases, connection to the online bank account of the client, etc.

These solutions are however complicated to implement for the bank, the information processing times and the cost of implementation being increased by the additional interactions with the user, and laborious for the bearer because this type of method requires, on his or her side, an additional interaction with the bank.

At the present time, there is no way of virtualizing such an object, for example a bank card, securely, reliably, in observance of the possible legal constraints linked to the sharing of the personal data of the bearer, and simply.

The invention offers a solution that does not present the drawbacks of the prior art.

INVENTION

To this end, according to a functional aspect, the subject of the invention is a method for managing the verification of the identity of a user of an object to be virtualized in a memory linked to a terminal of the user, the object comprising at least one datum, called identification datum, related to the identity of its bearer, said terminal being able to communicate with a virtualization server of an aggregator of the virtualization service, said virtualization server being able to communicate with a verification server having control of the object, said method comprising the steps of:

obtaining, by the virtualization server, of the identification datum of the object supplied by the user;

transmission, by the virtualization server, to the validation server, of the identification datum;

characterized in that it also comprises the steps of:

obtaining, by the virtualization server, of a datum relating to the user;

generation by the virtualization server of a first verification datum that is a function of the first datum relating to the user;

transmission by the virtualization server to the validation server of the first verification datum;

obtaining, by the validation server, of a second datum relating to the bearer;

generation, by the validation server, of a second verification datum that is a function of the second datum obtained relating to the bearer, said function being identical to that used in the step of generation of the first verification datum;

comparison of the first and of the second verification datum;

as a function of the result of the comparison, validation of the identity of the user.

Advantageously, the method according to the invention makes it possible, on the basis of a datum relating to the user and to the bearer, known respectively to the service provider, or content aggregator, and of the entity in charge of the identification, typically a bank, to perform the identification reliably. The knowledge of such a datum, such as, for example, the telephone number of the bearer, makes it possible in fact to implement a simple operation of evaluation of a verification datum on both sides, on each of the servers: if the verification data are identical, that means that the datum relating to the user and that relating to the bearer, known respectively to each of the two entities (the service provider and the bank) is the same, and therefore that the user of the card (the one requesting the service) is indeed the bearer, or holder of the card with the bank.

"Obtaining" should be understood to mean a simple operation allowing the server A (or B) to get the datum known to the corresponding entity, typically by a read in the database of the entity, and which excludes the direct transmission from one entity to the other.

That consequently makes it possible to verify the identity of the bearer by a secured method of "green path" type in which the verification that the bearer of the object and the user of the mobile are one and the same person is proven automatically. It is not therefore necessary, by using this mechanism, to proceed subsequently with an additional verification of the identity of the bearer (of "yellow path" type). The bank is freed in this way of a complex and costly operation, and the bearer of a tedious operation. Moreover, it will be noted that the bank has never had to transmit the personal datum (MSISDN) to a third-party entity (the service provider), which in some legislations would sometimes be impossible within the framework of the laws in force concerning personal data protection.

"Object to be virtualized" should be understood here to mean any type of object likely to be virtualized, whether physical (electronic card of bank type for example) or virtual (virtual payment token, etc.).

"Memory linked to the terminal" should be understood to mean that the memory is in the mobile terminal or in an external memory, the latter being able to be a security element of SIM card type, a secure memory zone of "Trusted Execution Environment" type, etc.

"User" should be understood here to mean the person who supplies the identification datum. If this user is the bearer of the card, the identification should be successful. Otherwise, the verification should fail.

"Identification datum, related to the identity of its bearer" should be understood to mean any datum which can serve to identify the bearer of the object during a transaction, for example his or her card number in the case of a bank card.

"Aggregator of the virtualization service" should be understood to mean an entity which is capable of offering a service to the client, of virtualization type, for one of his or her objects (for example a payment card).

"Verification server (B) having control of the object" should be understood to mean a server of the entity which has supplied the object to the bearer and which has information on the identity of said bearer (for example, a server of a banking, transport, or other such institution).

According to a first particular mode of implementation of the invention, a method as described above is characterized in that the object to be virtualized is an electronic card and in that the method also comprises the steps of:

generation of a token representative of the electronic card of the user;

delivery of the token to the mobile terminal by the virtualization server;

storage of the token in the memory linked to the mobile terminal of the user;

after the validation of the identity of the bearer, activation of the token.

Electronic card should be understood here to mean any type of physical card likely to be virtualized (tokenized): bank card (payment, credit, debit, or other such card) but also transport, loyalty, or other such card.

Advantageously according to this embodiment, the effective virtualization, that is to say the activation of the "token", is performed only if the identification of the bearer has succeeded. It will be noted that the generation of the "token" and the storage thereof can be performed beforehand, the token becoming effectively active only after the validation of the identification.

According to a second particular mode of implementation of the invention, which will be able to be implemented alternatively or in addition to the preceding one, a method as described above is also characterized in that the aggregator, or service provider, is the mobile operator of the mobile terminal and in that the second datum relating to the bearer and the first datum relating to the user are the call number of the mobile terminal.

Advantageously according to this mode, the telephone number is necessarily known to the mobile operator which controls the mobile terminal of the user; since this number is moreover very probably known to the entity which has issued (the bank of the bearer) the object to be virtualized, this knowledge common to the two entities makes it possible to considerably simplify the identification process while retaining a high security. In addition, the personal data (here, the telephone number) remain protected because there is no exchange of such data between the two entities.

According to a third particular mode of implementation of the invention, which will be able to be implemented alternatively or in addition to the preceding ones, a method as described above is also characterized in that it comprises the steps of:

generation of an unknown by the virtualization server;

transmission of the unknown by the virtualization server to the validation server;

and in that the generations of a first and of a second verification datum are a function of the unknown.

Advantageously according to this mode, an unknown is used in addition to the datum relating to the bearer and/or user to generate the verification datum. The unknown becomes a parameter of the generation function F. The use of such a random value, different for each virtualization operation, and known only to the two entities responsible for the two servers, makes it possible to increase the degree of security of the identification and guarantee a better protection of the personal data of the client in that, the verification datum generated being different on each implementation of the method (even for the same MSISDN), the third-party entities through which the communication passes will not be capable of making correlations which would make it possible to determine the profile of the bearer (age, preferences, etc.).

According to a fourth particular mode of implementation of the invention, which will be able to be implemented alternatively or in addition to the preceding ones, a method as described above is also characterized in that it comprises a step of transmission of the function for the generation of a verification datum by the virtualization server to the validation server.

Advantageously according to this mode, the generation function can be modified easily since its transmission implies that it is known to the two entities which control the two servers (for example, the mobile operator and the bank of the bearer).

According to a fifth particular mode of implementation of the invention, which will be able to be implemented alternatively or in addition to the preceding ones, a method as described above is also characterized in that the generation function is injective and has a secret reciprocal function.

"Secret" should be understood to mean that the reciprocal function (G) has to remain in the possession of the first entity (A). It is typically determined by A at the moment of creation of the generation function (F).

Advantageously according to this mode, the reciprocal function makes it possible to prove that the right datum relating to the user (MSISDN) has indeed been transmitted, in case of dispute.

According to another functional aspect, the invention relates also to a method for generating an identification element of an object to be virtualized in a memory linked to a terminal of the user, the object comprising at least one datum, called identification datum, related to the identity of its bearer, said terminal being able to communicate with a virtualization server of an aggregator of the virtualization service, said virtualization server being able to communicate with a verification server having control of the object, said method comprising, on the virtualization server, the steps of:
  obtaining of the identification datum of the object supplied by the user;
  transmission to the validation server of the identification datum;
characterized in that it also comprises the steps of:
  obtaining of a first datum relating to the user;
  generation of a first verification datum that is a function of the first datum relating to the user;
  transmission to the validation server of the first verification datum.

According to another functional aspect, the invention relates also to a method for verifying the identity of a user of an object comprising at least one datum, called identification datum, related to the identity of its bearer, on a verification server having control of the object, said method being characterized in that it comprises the steps of:
  reception of a first verification datum;
  obtaining of a second datum relating to the bearer;
  generation of a second verification datum that is a function of the datum obtained relating to the bearer;
  comparison of the first and of the second verification datum;
  as a function of the result of the comparison, validation of the identity of the bearer.

According to another hardware aspect, the invention relates also to a system for verifying the identity of a user of an object to be virtualized comprising at least one datum, called identification datum, related to the identity of its bearer, the system comprising:
  a mobile terminal of a user comprising:
    a module for supplying the identification datum;
    a module for storing the virtualization data;
    a communication module for communicating with a virtualization server,
  a virtualization server of an aggregator of the virtualization service, comprising:
    a communication module for communicating with a verification server;
    a module for obtaining the identification datum of the object supplied by the user;
    a module for transmitting the identification datum;
    a module for obtaining a first datum relating to the user;
    a module for generating a first verification datum that is a function of the first datum relating to the user;
    a module for transmitting the first verification datum,
  a verification server having control of the object comprising
    a module for obtaining a second datum relating to the bearer;
    a module for generating a second verification datum that is a function of the datum obtained relating to the bearer;
    a module for comparing a first and a second verification datum;
    a module for validating, as a function of the result of the comparison, the identity of the bearer.

The term module can correspond equally to a software component and to a hardware component or to a set of hardware and software components, a software component itself corresponding to one or more computer programs or subprograms or mobile programs or subprograms (application in a cellphone) or, more generally, to any element of a program capable of implementing a function or set of functions as described for the modules concerned. Similarly, a hardware component corresponds to any element or hardware that is capable of implementing a function or a set of functions for the module concerned (integrated circuit, chip card, memory card, etc.).

According to another hardware aspect, the invention relates also to a computer program capable of being implemented in a method for managing the verification of the identity of a user as defined previously, the program comprising code instructions which, when the program is executed by a processor, performs the steps thereof.

According to another hardware aspect, the invention relates also to a computer program capable of being implemented in a method for generating an identification element as defined previously, the program comprising code instructions which, when the program is executed by a processor, performs the steps thereof.

According to another hardware aspect, the invention relates also to a computer program capable of being implemented in a method for verifying the identity of a user as defined previously, the program comprising code instructions which, when the program is executed by a processor, performs the steps thereof.

According to yet another hardware aspect, the invention deals with a storage medium that can be read by a data processor on which is stored a program comprising program code instructions for the execution of the steps of one of the methods defined above.

The invention will be better understood on reading the following description, given by way of example and with reference to the attached drawings.

FIGURES

FIG. 1 represents a system (S) illustrating an embodiment of a method for verifying identity in the virtualization of a bank card according to the invention.

DETAILED DESCRIPTION OF AN EXEMPLARY EMBODIMENT ILLUSTRATING THE INVENTION

FIG. 1 represents a system (S) illustrating an embodiment of a method for verifying identity in the virtualization of a bank card according to the invention.

According to this embodiment of the invention, the user C asks his or her provider of tokenized services, here also called service aggregator, for the virtualization, or tokenization, in his or her mobile terminal (M), of a bank card (CC) associated with his or her bank account in a bank (B). According to this embodiment of the invention, the token (T) resulting from the virtualization will be stored at the end of the transaction in a security element of the mobile terminal and, optionally, activated on the infrastructure of the entity B if the verification of the user has been successful, that is to say if he or she is indeed the bearer of the card.

The token could alternatively be stored in the internal memory of the mobile terminal or any other external memory accessible thereby.

The bank is represented here through a validation server (B). This representation is naturally very schematic. The validation server of the bank is generally linked to another server, charged with performing what is called the "bank scheme" by the person skilled in the art, and which serves as intermediary between the virtualization server and the validation server proper. In this embodiment of the invention, for reasons of simplicity, validation and "bank scheme" servers are merged in a single server B associated with the bank.

The invention rests on the principle of a common knowledge, between the two entities (aggregator and bank), of a datum relating on the one hand to the user and on the other hand to the bearer.

The steps of a method according to this embodiment are detailed hereinbelow.

The user enters, in a step E10, the data of his or her bank card (CC) to be tokenized, via a graphical interface of a mobile application running, in this example, on his or her mobile terminal (M) under the control of the service aggregator. In this step, it is not yet known whether the user is truly the bearer of the card.

The server A, called virtualization server, of the service aggregator, is charged in this example with transmitting, to a validation server (B) of the bank responsible for the card (CC), the virtualization request (token request) for identification of the bearer of the bank card. According to this embodiment, the server A knows a datum specific to the user. In this example, the server A is the server of a mobile operator of the user and the datum is the telephone number, or MSISDN, of his or her mobile terminal. Naturally, the server A could depend on another type of entity (tax center, social security center, etc.), as well as the server B.

In a step E21, the server A of the service aggregator transmits the request to the server B of the bank of the bearer for identification of the bearer and validation of the virtualization.

It will be noted that, as explained previously, the validation server of the bank B generally uses other entities, including at least one other server known by the name of "bank scheme" by the person skilled in the art, responsible in particular for the generation of the tokens (T). For reasons of simplicity, a single server B is represented here in association with the bank.

The validation server (B) of the bank, receiving the request during a step E30, will have to check that the client of the server A, user of the cellphone M, is indeed the same individual as that having the bank account associated with the bank card CC and not another person who might have stolen it. As explained previously, the bank B has authentication and validation mechanisms which are specific to it. According to the state of the art, it identifies the bearer by a method known by the name of "green path" (automatic validation of the bearer of the card, after reception and analysis of the data) or "yellow path" (validation with secondary verification, during which the bearer provides another proof of his or her identity). The first method is without proof as to the real identity of the bearer of the card, inasmuch as it does not include any active security mechanism beyond the simple analysis by the bank of the data received in the virtualization request. The second is not absolutely reliable, increases the complexity of the bank system and slows down the client request processing time, which can be highly detrimental in particular if several requests are to be processed simultaneously.

According to this embodiment of the invention, the request from the server A is enriched by information which can be checked by the bank, thus avoiding it having to apply a complex method of "yellow path" type while guaranteeing the authentication of the bearer C of the card CC originating the request.

In a step E22, the server A generates an unknown corresponding to the transaction. An unknown is conventionally a randomly generated number. The fact of having a different random number on each transaction makes it possible to guarantee the observance of legal personal data management obligations of A (the MSISDN according to this example) by ensuring, the verification datum generated being different on each implementation of the method, that third-party entities through which the communication passes will not be capable of performing correlations which would allow them to reconstruct the profile of the bearer.

According to a variant, the exchanges between A and B are performed in an encrypted session, according to a mechanism well known to the person skilled in the art (for example on a TLS-type communication basis with mutual authentication by using certificates), which guarantees the following properties:

strong mutual authentication between A and B;
confidentiality of the exchanges;
integrity of the exchanges.

Combined with the observance of the legal obligations of A, that makes it possible to ensure a maximum security of the exchanges for B by avoiding in particular hacks by a so-called "replay" mechanism (retransmission of data already exchanged for fraudulent purposes, to simulate a legitimate request).

According to this example, the server A also transmits to the operator B a function, called verification function (F, HASH), to be applied also to the random number. Naturally, this function can have been supplied previously to the bank.

These data (unknown, function F) are received by the server of the bank during a step E31.

In a step E23, the server A retrieves a datum relating to the user without his or her intervention. According to this example, the server A is the server of a mobile operator of the user and the datum is the telephone number, or MSISDN, that it necessarily knows (without having to ask it of the user or a third-party entity).

In a step E24, the server A generates a verification datum to be transmitted to the bank, taking account of this datum of the user and the unknown, by using the generation function F, this verification datum being denoted in the FIGURE F(MSISDN+ALEA).

According to one embodiment, the generation consists in "hashing" the unknown concatenated with the telephone number. Such a "hashing" function is well known to the person skilled in the art.

According to another embodiment, the function F is an injective function, that is to say that any result obtained by this function at most allows an antecedent. In this case, according to a variant, the server A has a function G that is the reciprocal of the function F such that the composition of the two functions (denoted G° F.) makes it possible to retrieve the datum of the bearer, here his or her MSISDN number, that is to say that it is possible to write:

MSISDN=GoF(MSISDN)

This makes it possible for the service aggregator, in case of doubt or problem in the progress of the procedure, to verify that the telephone number that it has transmitted to the bank (the MSISDN) is correct, that is to say that it is indeed that of the bearer. It will be noted that the two reciprocal functions must use, in addition, the same unknown in the same way (as parameter of each of the functions) for correct operation.

It will be noted also that the function G must be a function that is secret and impossible to deduce from F. It must be impossible to compute this function G for anyone who has not participated in the definition of F, even if F is known, that is to say that the complexity necessary to the identification of a function G such that G° F. is the identity function must be sufficiently high (according to the knowledge of the person skilled in the art) to avoid any possibility of being able to determine it in practice.

For example, such functions F and G can rely on cryptographic functions of asymmetrical type, well known to the person skilled in the art, to ensure that F can be a public function while ensuring that G remains secret.

Optionally, the verification datum resulting from the generation using the function F and/or the unknowns are encrypted by a security key known only to the server A and to the server B.

The validation server (B) of the bank receives the verification datum in a step E32.

In a step E33, the server B searches on its side for similar information relating to the bearer (the telephone number according to this example) possibly formatted according to modalities approved previously by the entities A and B (for example, telephone number in international and not national version). It will be noted that, in accordance with this embodiment, the bearer is known to the bank B since he or she has an account there and a payment card. In addition, still according to this example, the bank B has a strong commercial interest in having the correct telephone number of the bearer for the correct procedure of certain payment authorization operations. It is therefore highly probable that the bank B knows the correct telephone number of the bearer (that is to say that (MSISDN'=MSISDN)).

If such is the case, the bank, receiving the request, can use the unknown received in the step E31 and the datum of the bearer obtained in the step E33 to execute the same injective function F as the server A on the set of the two values to obtain a second verification datum. It will be recalled that the function F was obtained by the bank in a prior step, for example E31.

In a step E34, this second verification datum is compared to that received in the step E32. If the comparison is positive (the result does indeed correspond to that sent by A), then the bank B can have the guarantee that the two data relating respectively to the user and to the bearer (MSISDN and MSISDN') are identical, and therefore that the user is indeed the owner of the card CC and of the associated bank account. The identification of the bearer is validated. The "green path", or automatic validation, has just been performed reliably and verifiably.

The validation server B then generates, during a step E35 (or has generated by a server B' responsible for the bank scheme), according to a known method departing from the framework of the invention, the virtualization data (T) corresponding to the token of the tokenized card; the token (T) is transmitted to the virtualization server.

According to another possible mechanism, the token is generated and stored whatever the result of the comparison, but will be activated only when the verification is successful, that is to say on completion of the step E35.

These data are received by the virtualization server during a step E25, then transmitted and stored in the mobile terminal of the user (for example in a security element which is associated therewith), during a step E11.

If, on the contrary, on the completion of the step E34, the comparison of the two verification data is negative, or if the bank is not capable, in the step E33, of retrieving the datum relating to the bearer (because it does not know his or her telephone number for example), the identification of the bearer is not validated. The bank will be able to conventionally apply the so-called "yellow path" method in accordance with the state of the art, that is to say that it will be able to ask of the cellphone user to supply an additional identity verification datum.

It will easily be understood that the common knowledge of a datum relating to the user and to the bearer (the telephone number in this example, which is necessarily known to the mobile operator and very probably known to the bank) and of a function to be applied to it (in this example, the function F associated with the unknown) makes it possible to considerably simplify the identity verification process, in that it does not require any intervention on the part of the user, while offering a high level of security and while ensuring the confidentiality of the personal data associated with the client (MSISDN, etc.)

It goes without saying that the embodiment which has been described above has been given in a purely indicative and nonlimiting manner, and that numerous modifications can easily be made by the person skilled in the art without in any way departing from the framework of the invention.

In particular, as has been described previously, the data exchanged between the server A and the server B can be encrypted.

According to a variant, elements other than the telephone number, or MSISDN, of the bearer, can be used.

Moreover, other elements can be used in addition, by using equivalent personal and security data protection mechanisms:

elements linked to the mobile of the user (mobile name, mobile type, OS type, OS version, "user agent" of the mobile, IMEI, etc.);

elements linked to the geolocation of the user;

private information known by A and B (billing address, age, date of birth, etc.).

According to another variant, the method is applied to electronic cards other than a payment card:

loyalty card;

transport card (air, metro, train, bus, etc.).

The invention claimed is:

1. A management method for managing verification of an identity of a user of an object to be virtualized in a memory linked to a terminal of the user, the object comprising at least one datum, called identification datum, related to the identity of its bearer, said terminal being able to communicate with a virtualization server of an aggregator of a virtualization service, said virtualization server storing a first datum relating to the user and being able to communicate with a validation server having control of the object and storing a second datum relating to the bearer, said method comprising:
   obtaining, by the virtualization server, the identification datum of the object supplied by the user;
   transmitting, by the virtualization server, to the validation server, the identification datum;
   obtaining, by the virtualization server, said first datum corresponding to the obtained identification datum;
   generating, by the virtualization server, a first verification datum that is a function of the first datum relating to the user;
   transmitting, by the virtualization server, to the validation server the first verification datum;
   obtaining, by the validation server, the second datum corresponding to the first datum;
   generating, by the validation server, a second verification datum that is a function of the second datum relating to the bearer, said function being identical to that used in generating the first verification datum;
   comparing the first and of the second verification datum;
   as a function of the result of the comparison, validating the identity of the user.

2. The management method as claimed in claim 1, wherein the object is an electronic card and the method also comprises:
   generating a token representative of the electronic card of the user;
   delivering the token to the mobile terminal by the virtualization server;
   storing the token in the memory linked to the mobile terminal of the user,
   after the validation of the identity of the bearer, activating the token.

3. The management method as claimed in claim 1, wherein the service aggregator is the mobile operator of the mobile terminal and the second datum relating to the bearer and the first datum relating to the user are the call number of the mobile terminal.

4. The management method as claimed in claim 1, further comprising:
   generating an unknown by the virtualization server;
   transmitting the unknown by the virtualization server to the validation server;
   and wherein the generations of the first and a second verification datum are a function of the unknown.

5. The management method as claimed in claim 1, further comprising transmitting the function for the generation of a verification datum by the virtualization server to the validation server.

6. The management method as claimed in claim 1, wherein the generation function is injective and has a secret reciprocal function.

7. A method for generating an identification element of an object to be virtualized in a memory linked to a terminal of the user, the object comprising at least one datum, called identification datum, related to the identity of its bearer, said terminal being able to communicate with a virtualization server of an aggregator of the virtualization service, said virtualization server storing a first datum relating to the user and being able to communicate with a validation server having control of the object and storing a second datum relating to the bearer, said method comprising, on the virtualization server:
   obtaining the identification datum of the object supplied by the user;
   transmitting, to the validation server, the identification datum;
   obtaining said first datum corresponding to the obtained identification datum;
   generating a first verification datum that is a function of the first datum relating to the user;
   transmitting to the validation server the first verification datum.

8. A verification method for verifying identity of a user of an object comprising at least one datum, called identification datum, related to the identity of its bearer, on a validation server having control of the object and storing a second datum relating to the bearer, said method comprising:
   receiving a first verification datum;
   obtaining said second datum corresponding to the received first datum;
   generating a second verification datum that is a function of the datum relating to the bearer;
   comparing the first and of the second verification datum;
   as a function of the result of the comparison, validation of the identity of the bearer.

9. A system for verifying an identity of a user of an object to be virtualized comprising at least one datum, called identification datum, related to the identity of its bearer, the system comprising:
   a mobile terminal of a user comprising at least one first processor configured by code instructions stored on at least one first computer-readable medium to:
      supply the identification datum;
      store the virtualization data;
      communicate with a virtualization server,
   a virtualization server of an aggregator of the virtualization service storing a first datum relating to the user and, comprising at least one second processor configured by code instructions stored on at least one second computer-readable medium to:
      communicate with a validation server;
      obtain the identification datum of the object supplied by the user;
      transmit the identification datum;
      obtain a first datum corresponding to the obtained identification datum;
      generate a first verification datum that is a function of the first datum relating to the user;
      transmit transmitting the first verification datum;
   a validation server storing a second datum relating to the bearer and having control of the object and comprising at least one third processor configured by code instructions stored on at least one third computer-readable medium to:

obtain a second datum corresponding to a received first datum;

generate a second verification datum that is a function of the datum relating to the bearer;

compare a first and a second verification datum;

validate, as a function of the result of the comparison, the identity of the bearer.

10. Non-transitory computer-readable mediums comprising code instructions stored thereon, which when executed by a processor of by the virtualization server and a processor of by the validation server, configure the virtualization server and the validation server to implement the management method in accordance with claim 1.

11. A non-transitory computer-readable medium comprising code instructions stored thereon, which when executed by a processor of by the virtualization server, configure the virtualization server to implement the method for generating an identification element in accordance with claim 7.

12. A non-transitory computer-readable medium comprising code instructions stored thereon, which when executed by a processor of by the validation server, configure the validation server to implement the verification method in accordance with claim 8.

* * * * *